United States Patent
Fredericks et al.

(10) Patent No.: US 10,055,276 B2
(45) Date of Patent: Aug. 21, 2018

(54) PROBABILISTIC DETECT IDENTIFICATION

(71) Applicant: International Business Machines Corporation, Armonk, NY (US)

(72) Inventors: Christopher G. Fredericks, Fredericton (CA); Tien Hiong Lee, Singapore (SG); Konstantin Levinski, Singapore (SG); Xin Qian, Singapore (SG); Weng Sing Tang, Singapore (SG); Xiang Zhang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 15/347,341

(22) Filed: Nov. 9, 2016

(65) Prior Publication Data
US 2018/0129549 A1    May 10, 2018

(51) Int. Cl.
    *G06F 11/00* (2006.01)
    *G06F 11/07* (2006.01)
    *G06F 7/20* (2006.01)

(52) U.S. Cl.
    CPC ........... *G06F 11/079* (2013.01); *G06F 7/20* (2013.01); *G06F 11/0709* (2013.01); *G06F 11/0751* (2013.01); *G06F 11/0778* (2013.01)

(58) Field of Classification Search
    CPC ..... G06F 11/25; G06F 11/267; G06F 11/3409
    USPC ........................................................ 714/39
    See application file for complete search history.

(56) References Cited

U.S. PATENT DOCUMENTS

| | | | |
|---|---|---|---|
| 7,614,043 B2 | 11/2009 | Ognev et al. | |
| 9,244,755 B2 | 1/2016 | Huang et al. | |
| 2002/0083040 A1* | 6/2002 | Aoshima | G06F 11/25 |
| 2005/0025242 A1* | 2/2005 | Ma | G06T 7/20 |
| | | | 375/240.16 |
| 2005/0222816 A1* | 10/2005 | Cheng | G01R 31/318547 |
| | | | 702/185 |
| 2006/0111873 A1* | 5/2006 | Huang | G01R 31/318547 |
| | | | 702/185 |
| 2007/0204344 A1 | 8/2007 | Xue | |
| 2009/0144699 A1 | 6/2009 | Fendt et al. | |
| 2013/0346917 A1* | 12/2013 | Bragdon | G06F 11/3419 |
| | | | 715/802 |
| 2014/0365828 A1 | 12/2014 | Jiang et al. | |
| 2015/0082109 A1* | 3/2015 | Patel | G06F 11/2236 |
| | | | 714/727 |

\* cited by examiner

*Primary Examiner* — Sarai E Butler
(74) *Attorney, Agent, or Firm* — Francis Lammes; Stephen J. Walder, Jr.; Jeffrey S. LaBaw (57) ABSTRACT

A mechanism is provided for detecting one or more defects in an incoming log. One or more features are extracted from the incoming log. Utilizing the one or more features, one or more patterns, one or more pattern sequences of the one or more patterns, and one or more proximities associated with the one or more patterns contained in the incoming log are identified. For each defect model generated for the incoming log, a set of patterns in the defect model is compared to a set of patterns in each previously identified defect model in a set of previously identified defect models. Responsive to identifying a match and responsive to set of scores associated with the match meeting or exceeding a set of probability thresholds, an identification associated with the previously identified defect model along with any solution or workaround is passed to a support engineer.

20 Claims, 6 Drawing Sheets

PROBABILISTIC DETECT IDENTIFICATION

BACKGROUND

The present application relates generally to an improved data processing apparatus and method and more specifically to mechanisms for probabilistic defect identification.

When a customer encounters an issue in a software product, one solution is to submit a service request to product support using an online service request tool. The customer is required to fill in issue details on a service request form before submitting the service request. A support engineer reviews the customer's service request, determines a nature of the issue, and decides priority of the issue depending on the impact of the issue on the customer's environment. The service request may be rejected if crucial information about the issue is lacking, because such information is required to allow the support engineer to make an informed assessment of the situation and impact of the problem to the customer's environment, and to enable the support engineer to conduct a meaningful and thorough investigation. In such a scenario, the support engineer will have to request the customer for feedback to provide more clarity about the issue so that the service request can be addressed by the support engineer in the best way possible.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for detecting one or more defects in an incoming log. The illustrative embodiment extracts one or more features from the incoming log by uncovering corpus/semantics, structural, and sequential features in the incoming log in response to receiving the incoming log. Utilizing the one or more features, the illustrative embodiment identifies one or more patterns, one or more pattern sequences of the one or more patterns, and one or more proximities associated with the one or more patterns contained in the incoming log. The illustrative embodiment generates one or more defect models for the incoming log using the identified one or more patterns, the one or more pattern sequences, and one or more proximities. For each defect model in the one or more defect models for the incoming log, the illustrative embodiment compares a set of patterns in the defect model to a set of patterns in each previously identified defect model in a set of previously identified defect models. The illustrative embodiment determines whether a score associated with each pattern match meets or exceeds an associated probability threshold in response to matching the set of patterns in the defect model to the set of patterns in a previously identified defect model. The illustrative embodiment passes a defect identification associated with the previously identified defect model along with any solution and/or workaround for the previously identified defect to a support engineer so that the defect in the incoming log is addressed in response to each score meeting or exceeding the associated probability threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As stated previously, when a customer encounters an issue in a software product, one solution is to submit a service request, which a support engineer reviews to determine a nature of the issue and decides priority of the issue depending on the impact of the issue on the customer's environment. Of particular interest is the scenario when the customer escalates an issue for which other customers have already experienced a same issue and there already exists a solution or an acceptable workaround for the issue. Unfortunately, before the support engineer determines the issue to be a known problem and recommend the appropriate solution or workaround to the customer, the support engineer proceeds through the long and tedious process of gathering relevant information about the issue, seeking clarifications with the customer, analyzing the log files, and identifying problem areas in the logs.

This full investigation cycle, which requires the support engineer to manually check for errors and warning signs and spot specific patterns in tens of thousands of log lines, comb through the organization's support database to find possible known defects that may be related to the issue under investigation, manually compare relevant log lines in the customer's logs with archived logs in the support database, and even collaborates with other support engineers from different geographical locations to find out if the other support engineers have seen or dealt with identical issues in the field, is necessary. Unfortunately, these activities incur cost to the organization and adds to the issue resolution cycle time. Such information exchange between the customer and the support engineer may drag on for days, weeks, or even months for more complex issues.

It seems that the long cycle time of information exchange and interaction between the customer and support engineer is inevitable and is a bottleneck in the business process, which cause problems such as wasted time and lost revenue. The problem is further exacerbated by the fact such support is always dependent on human resource, delivered by support engineers from different geographical locations, because whenever there is human involvement, the human involvement creates a challenge for the organization to deliver satisfying and consistent customer experience. The long turnaround time to issue a resolution coupled with the problem of uneven customer experience definitely has a profound impact on customer satisfaction and confidence on the software product.

The illustrative embodiments provide mechanisms for probabilistic defect identification. That is, customer-based software often presents the same issues to different customers. The customers have no knowledge to identify the defect and to find the error description for the defect. Thus, when an issue is detected, customers have to go through the process of opening a service request, uploading logs, and corresponding with one or more support engineers to exchange information. This process may be unnecessary and time is wasted if the issue has already been solved for other customers. On the support side, when a service request arrives, the support engineer initially has no idea whether the case has ever seen before. The support engineer has to go through the full cycle: checking the symptoms, searching the support database, and consulting their peers to check whether the case they have encountered before.

Thus, customers experience inconsistent support, during each interaction with support engineers. Moreover, when one support engineer leaves the software product company, the support engineer takes away accumulated expertise and familiarity with previous issues and log patterns. For support engineers dealing with the logs, the dominant searching technique is regular expressions. However, as is known in the art, regular expressions are very expensive in terms of time, processor usage, and memory usage. The cost of time further increase if the size of logs increases or the number of keywords increases. Moreover, it is also time consuming for experts to write regular expression for logs lines.

Approximate matching is a useful approach to detecting patterns in the logs. Comparing different parts of the patterns separately and ranking them according to the features detected is one approach. Such an approach of finding the presence of sequential patterns in logs does not take into account factors such as the proximity of the features in patterns and the proximity of the patterns in the log. It is very challenging and limiting to implement pattern detection using keyword-based rules and regular expressions-based rules and therefore, scalability is a major issue when such approaches are utilized in patterns detection systems.

Moreover, in actuality, when there is an issue in the customer's software product, support engineers do not know what the exact problem is. Hence, the support engineers have to search all possible defects that might happen. Some log formats may change as software's version change. Thus, if the old patterns are used to search the events, the support engineer may not identify the correct result. Therefore, a scalable approach to diagnose the problem is required, so that the support engineer may be confident to apply the suggested solution to the problem.

To counter these problems in software product support, the illustrative embodiments provide mechanisms for identifying defects based on probabilistic techniques, factoring in proximity measure between patterns and pattern sequences in logs. Log files contain rich information about operations of the software product and are typically stored as structured text. Delving into the rich contents within them uncovers a "make-up" of the log: a complex intermix of corpus/semantic contents, structural properties, sequential features, or the like, and their associated proximity, which collectively characterizes the logs themselves and all the activities and events captured in them. Understanding the "make-up" of the logs is invaluable, as this knowledge allow for properly describing and characterizing the defects, using statistical techniques and logs dependent heuristics.

In the illustrative embodiments, the described mechanisms match parts of logs indicative of a defect in the software product. Logs contain text entities, so special care needs to be taken to make sure the changeable nature of the logs is accounted for, and at the same time, events themselves have to be dealt with in a deterministic manner. In the illustrative embodiment, the corpus/semantic contents, structural properties, sequential information, or the like, and their associated proximity, are extracted from the logs using probabilistic techniques and log-specific heuristics, in order to discover underlying structures that defines the "make-up" of the defects, and to use the knowledge learned by analyzing the properties of the defect imprints in the logs, for detecting the presence of defects in logs.

During the defect learning phase, the illustrative embodiments succinctly capture the "make-up" of the detects by uncovering underlying properties in the training logs. The deep insights gained from analyzing the intermingled features within the logs are used to build a scalable database of defect models. In the illustrative embodiments, the mechanisms implement defect models using weighted graphs. The use of weighted graphs is just one way to implement the defect model. The defect models implementation is, therefore, not restricted to weighted graphs. The defect models contain the patterns and salient features that characterize the defects, the threshold conditions (probability thresholds) of the patterns for transition between the patterns, and the proximity measures between the patterns. The defect models are the "deoxyribonucleic acid (DNA)" of the defects as they uniquely characterize the "make-up" of the defects, and are stored in a Defect DNA Database, for defect matching and identification in the defect detection phase. Hence, the illustrative embodiments amasses a significant amount of training logs, analyzes them, and then builds a comprehensive knowledge base of defect models in the Defect DNA Database, and this knowledge base will be expanded and enhanced through feedback of training logs and live logs.

During the defect detection phase, incoming logs are fed into a detection engine to discover pattern sequences of interest and extract salient features related to defect(s) in the logs and a defect model of the incoming log is constructed in a similar fashion defect models are constructed for the training logs in the learning phase. If the log DNA of the incoming logs matches with a defect DNA in the Defect DNA Database, the illustrative embodiments detect a defect and output the detailed defect information with a possible solution and workaround to the support engineer, if no DNA match is found, the incoming log will be fed to the learning phase to be treated as a new training log and a new detect DNA will be generated and added the Defect DNA Database. Hence, when logs containing features that are characteristics of this new defect are fed into the defect detection phase in future, a DNA match will occur and the defect will be detected.

For the illustrative embodiments, changes in log format may be tolerated while maintaining locality of the matching, so that the defect may be still detected for a different version of the software. Furthermore, the probabilistic approach uses proximity measures and locality preservation to remove false positives. Patterns in sequences are combined to provide for a more precise definition of more intricate defects in the logs, separating parts that slightly vary, from sequences that remain constant for the defect. Hence, the illustrative embodiments handle variances in sequences and proximity, and variances may be tolerated with the instant probabilistic approach. Existing patterns detection systems, which use keyword and/or regularly expression based rules to specify the predefined patterns, does not take into account or handle such variances in sequences and/or proximity.

The illustrative embodiments also refine feature weights, probability thresholds, and proximity measures of neighboring patterns using a feedback mechanism. These parameters are sent back to the learning phase through a feedback loop for fine tuning and subsequent update to the Defect DNA Database, to continually improve the defect detection accuracy.

Most commonly used techniques use fix-formatted example logs to make keys to do key words searching, to write regular expressions in order to perform pattern matching. If the logs change, keys have to be updated or the regular expressions have to be modified, otherwise they would cease to work. However, making keys and writing regular expressions are very time consuming, and the latter is dependent on specific skill sets of a developer. Taking regular expressions as an example, for each content that is to be match, a regular expression is required to be written. Subsequently, if the format of example logs changes, the original regular expression needs to be updated to take into account of the change in format. The constant need to update the keys or regular expression will incur high maintenance and labor cost; such approaches are not scalable in the end.

The illustrative embodiments require very minimal human intervention compared to most commonly used techniques of using keys and regular expressions for words matching in logs. Support engineers need not modify anything when training the mechanisms of the illustrative embodiment to learn new defects. The support engineers merely feed useful log lines from example logs during the learning phase. Hence, the illustrative embodiments construct the sequence of patterns and compute the proximity for the patterns. All these information are stored in a Defect DNA Database for defect identification in the defect identification phase.

Before beginning the discussion of the various aspects of the illustrative embodiments, it should first be appreciated that throughout, this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
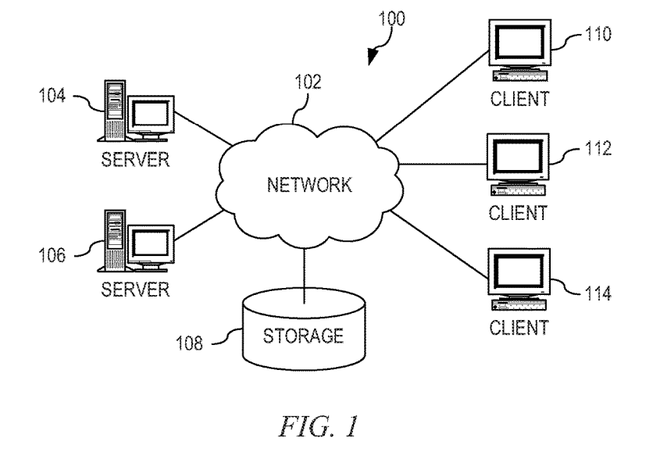
FIG. 1 is an example diagram of a distributed data processing system in which aspects of the illustrative embodiments may be implemented.
Figure 2:
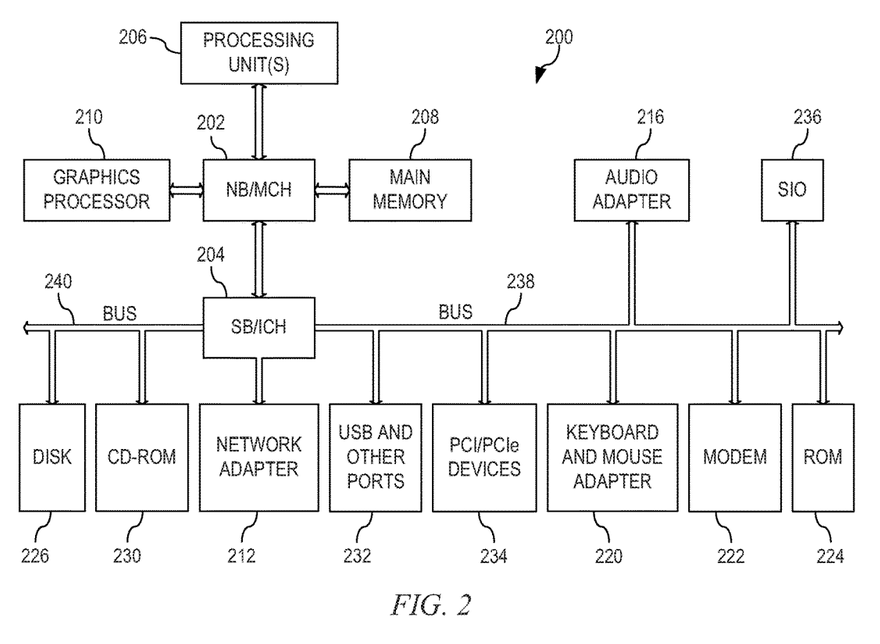
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104 may be specifically configured to implement a mechanism for identifying defects based on probabilistic techniques, factoring in proximity measure between patterns and pattern sequences in logs. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates identifying defects based on probabilistic techniques, factoring in proximity measure between patterns and pattern sequences in logs.

As noted above, the mechanisms of the illustrative embodiments utilize specifically configured computing devices, or data processing systems, to perform the operations for identifying defects based on probabilistic techniques, factoring in proximity measure between patterns and pattern sequences in logs. These computing devices, or data processing systems, may comprise various hardware elements that are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanism for identifying defects based on probabilistic techniques, factoring in proximity measure between patterns and pattern sequences in logs.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
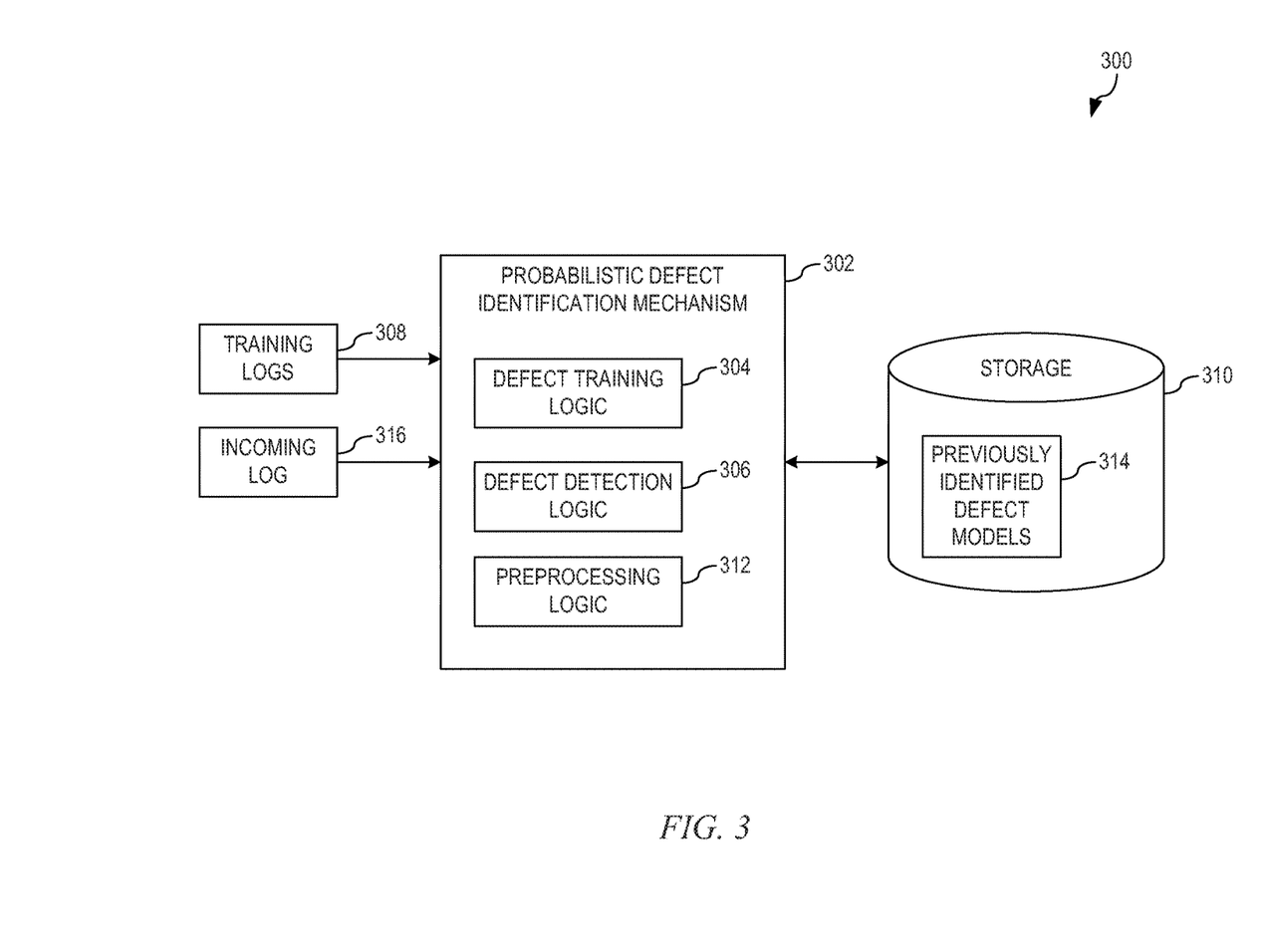
FIG. 3 depicts a functional block diagram of a probabilistic defect identification mechanism that identifies defects based on probabilistic techniques, factoring in proximity measure between patterns and pattern sequences in logs in accordance with an illustrative embodiment.

FIG. 3 depicts a functional block diagram of a probabilistic defect identification mechanism that identifies defects based on probabilistic techniques, factoring in proximity measure between patterns and pattern sequences in logs in accordance with an illustrative embodiment. As stated previously, probabilistic defect identification mechanism 302 in data processing system 300 operates in two distinct phases: a defect learning phase and a defect detection phase. Thus, defect identification mechanism 302 comprises defect training logic 304 and defect detection logic 306, in the defect learning phase, defect training logic 304 operates to capture the "make-up" of the defects in a set of training logs 308 by uncovering underlying properties in the set of training logs 308.

Before explaining the details of the defect learning phase, it is important to understand what a defect is as used in the illustrative embodiments. In the illustrative embodiments, a defect is made of one or more patterns occurring in a certain order, a pattern is made up of any combination of features without considerations being made to the order of occurrences of the features in the pattern, and a feature is comprised of one or two substrings. More specifically, with respect to the one or two substrings that make up a feature, the contents of the substring(s), along with the position of the single substring or the order of occurrences of the two substrings uniquely define a feature. For example: Feature A comprises Substring 1 followed by Substring 2, Feature B comprises only Substring 2, and Feature C comprises Substring 2 followed by Substring 1. For Feature A, Substring 1 occurs before Substring 2, while for Feature C, Substring 2 occurs before Substring 1. Therefore, Feature A and Feature C are distinct because of the sequences in which the two substrings occur in the features, Feature B is distinct because it only comprises Substring 2. Features may be broadly classified into three main types: Paired Features (Feature$_{paired}$), Skipped Paired Features (Feature$_{skipped\_pair}$), and Positional Features (Feature$_{positional}$). Paired Features are features where the substrings are adjacent to each other. Skipped Paired Features are features where the features have at least one feature between the paired features. Positional features are features where the substrings include positional information. For example, suppose a log line contains four substrings: substring A, substring B, substring C, and substring D in order. The Paired Features would include:

Feature 1: comprises of NULL followed by and substring A,

Feature 2: comprises of substring A followed by substring B,

Feature 3: comprises of substring B followed by substring C,

Feature 4: comprises of substring C followed by substring D,

Feature 5: comprises of substring D followed by NULL.

The Skipped Paired Features would include:
  Feature 6: comprises of Null followed by sub-string B,
  Feature 7: comprises of substring A followed by substring C,
  Feature 8: comprises of substring B followed by substring D,
  Feature 9: comprises of substring C followed by NULL.

The Positional Features would include:
  Substring A at position 1,
  Substring B at position 2,
  Substring C at position 3,
  Substring D at position 4.

As stated previously, a pattern is made up of any combination of features without considerations being made to the order of occurrences of the features in the pattern, in the illustrative embodiments, the number of features in the pattern must be at least one, the order in which the features occur is irrelevant, and as long as a pattern contains the same features as another pattern, these two patterns are considered identical. Thus, in the Example, above Pattern $P_A$ is made up of three features: Feature A, Feature B, and Feature C, and the order in which these features occur is irrelevant as far as pattern definition is concerned.

The probability of certain pattern $P_K$ occurring is computed by the formula:

$$P(PatternP_k \, occurring) = \frac{\sum_{i=1}^{n} W_{f_i}}{n}$$

where $W_{fi}$ denotes the weight assigned to a feature in the pattern. The weights in this formula denote the significance of the features in the pattern and they are assigned to the features present in the pattern during the defect learning phase. Weights are empirical numerical values that range from 0 to 1. A feature with a weight value on the lower end of the range (i.e. close to 0) means that the feature plays an insignificant role in defining the pattern. On the other hand, a feature with weight value on the upper end of the range (i.e. close to 1) is very significant in defining the pattern. The probability of certain pattern occurring is computed by summing up the weights of every, i=1 to n, detected feature f and dividing the resultant by the total number n of features present in the pattern.

Using a set of identified patterns, defect identification mechanism 302 is trained to identify defects from a log file. That is, defect identification mechanism 302 detects, with a log, a defect that is made of a number of patterns occurring in a certain order. For example, Defect N comprises three patterns $P_A$, $P_B$, and $P_C$, appearing in the order $P_A$ followed by $P_B$ and $P_B$ followed by $P_C$. As another example, Defect M also comprises of the same three patterns, $P_A$, $P_B$, and $P_C$. However, the order of the patterns in Defect M is different. That is, in Defect M, $P_C$ is followed by $P_B$ and $P_B$ is followed by $P_A$ making Defect M different from Defect N.

Before defect training logic 304 analyzes the set of training logs 308, preprocessing logic 312 preprocess the set of training logs 308 to remove varying contents of variable tokens through a normalization process. Normalization of the set of training logs 308 is a process whereby only substrings that include changing values are substituted with placeholder tokens, such as [#DATE#], [#IP#], [#URL#], [#N#], so that efficient and meaningful matching may be performed subsequently on those substrings. Thus, preprocessing logic 312 reads in the string from each log in the set of training logs 308 line by line and splits each line using space characters and symbols to generate sub-strings. Preprocessing logic 312 then identifies sub-strings of the type variables, such as word, number, time, IP, URL, or the like. Preprocessing logic 312 then substitutes different types of variable sub-strings by their respective place-holders. The format of the variable sub-strings is preserved after substitution. For example, preprocessing logic 312 replaces a date with the token [#DATE#] in the logs. After normalization, the date format is preserved but its contents are ignored, because the contents are irrelevant as far as pattern identification and matching is concerned. All non-variable substrings remain intact during normalization.

After normalization of substrings that include changing values, defect training logic 304 extracts paired features, skipped features, and/or positional features from the set of normalized training logs 308. Defect training logic 304 then implements a process whereby a corpus/semantics, structural, and sequential features are uncovered in the set of normalized training logs 308; patterns contained in the set of normalized training logs 308 are uncovered using the uncovered features; and one-to-one or one-to-many relationships between the set of training logs 308 and defects from the patterns are established.

Logs within the set of training logs 308 may come in a variety of formats and diversification of elements, and every log contains a complex intermingling of corpus/semantics, structural, and sequences information and their associated proximity. Understanding the intermingling of these features within the set of training logs 308 is necessary to properly describe and characterize defects, using statistical techniques combined with logs dependent heuristics. During the Defect Learning Phase, defect training logic 304 analyzes the "makeup" of a defect by uncovering underlying properties that are essential for proper characterization of the defect. The deep insights gained from analyzing the intermingled features within the set of training logs 308 are used by defect training logic 304 to build a set of previously identified defect models 314. In the illustrative embodiments, every defect is modeled by a defect model, which captures the inherent features of the defect. Therefore, a defect model is like a "DNA" of the defect, as it uniquely characterizes the "make-up" of the defect.

Figure 4:
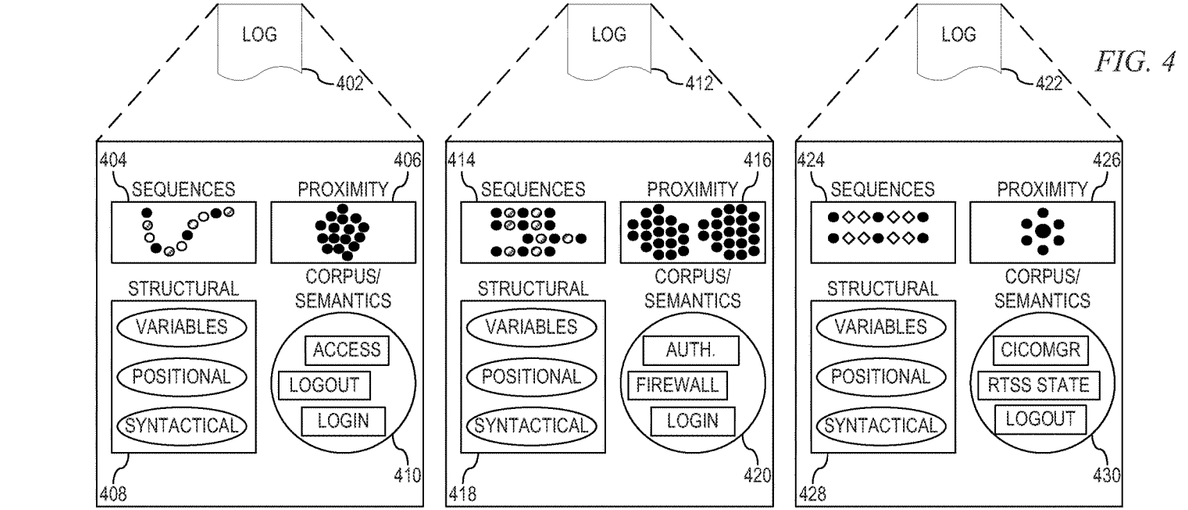
FIG. 4 shows the "make-up" of three training logs in accordance with an illustrative embodiment.
Figure 5:
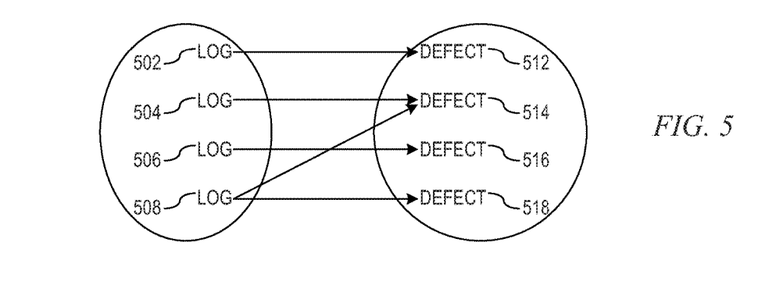
FIG. 5 illustrates a mapping of identified patterns from log DNAs to defect DNA in accordance with an illustrative embodiment.

FIG. 4 shows the "make-up" of three training logs in accordance with an illustrative embodiment. In the illustrative embodiments, defect training logic 304 takes into consideration the unique roles that proximity and sequences play during the defect learning phase. As is illustrated in FIG. 4, logs 402, 412, and 422, each comprise their own respective sequences 404, 414, or 424, proximity 406, 416, or 426, structural features 408, 418, or 428, and corpus/semantics 410, 430, or 440, which may form one or more patterns. As is further illustrated, each of the one or more patterns in each of logs 402, 412, and 422 may be mapped to one or more distinct defects based on associated unique combinations of sequences, structural features, corpus/semantics, or the like, that form log DNAs. As shown in FIG. 5, the mapping of identified patterns from log DNAs to defect DNA may be a one-to-one relationship or a one-to-many relationship in accordance with an illustrative embodiment. That is, more than one defect may exist in any one log. For example, log 502 includes defect 512, log 504 includes defect 514, log 506 includes defect 516, but log 508 includes both defect 514 and 518.

As stated previously, defect training logic 304 builds the set of previously identified defect models 314 utilizing the insights gained from analyzing the intermingled features within each of the set of training logs 308, which form one or more patterns. Defect training logic 304 utilizes the set of previously identified defect models 314, which are implemented using weighted graphs, although other forms of implementation may also be possible, to capture salient patterns and their associated features of each log in the set of training logs 308, which are then utilized in training. The uniqueness of each log in the set of training logs 308, as is illustrated in FIG. 4, are succinctly captured by the set of previously identified defect models 314 showing the relevant patterns identified for the defects and threshold conditions (described using threshold probabilities) for transition between the patterns. That is, each defect within a log is a sequence of patterns identified by the unique combinations of sequences, structural features, corpus/semantics, or the like, and their associated proximity that is a distance measure in units of time.

Figure 6:
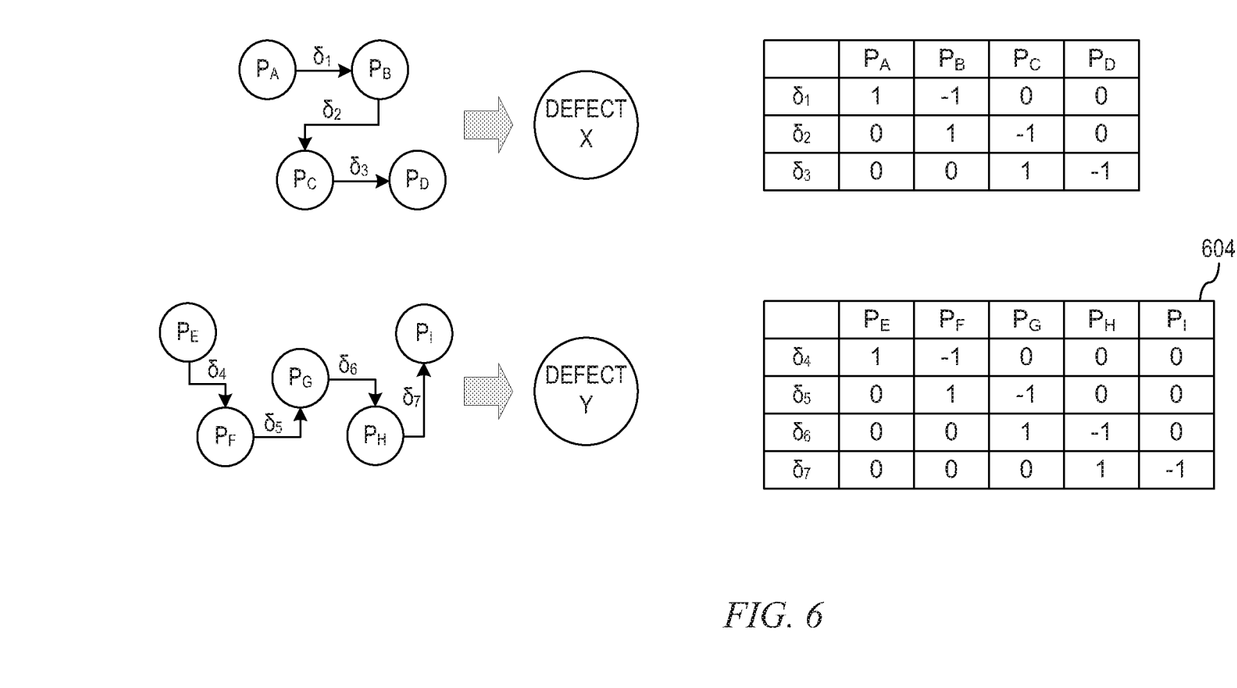
FIG. 6 illustrates defects generated based on a set of patterns and a set of edges in accordance with an illustrative embodiment.

For example, as is shown in FIG. 6 in accordance with an illustrative embodiment, a first defect, Defect X, includes a set of patterns $P_A$, $P_B$, $P_C$, and $P_D$ coupled together by edges $\delta_1$, $\delta_2$, and $\delta_3$, such that pattern $P_A$ is coupled to pattern $P_B$ by edge $\delta_1$, pattern $P_B$ is coupled to pattern $P_C$ by edge $\delta_2$, and pattern $P_C$ is coupled to pattern $P_D$ by edge $\delta_3$. A second defect, Defect Y, includes a set of patterns $P_E$, $P_F$, $P_G$, $P_H$, and $P_I$ coupled together by edges $\delta_4$, $\delta_5$, $\delta_6$, and $\delta_7$, such that pattern $P_E$ is coupled to pattern $P_F$ by edge $\delta_4$, pattern $P_F$ is coupled to pattern $P_G$ by edge $\delta_5$, pattern $P_G$ is coupled to pattern $P_H$ by edge $\delta_6$, and pattern $P_H$ is coupled to pattern $P_I$ by edge $\delta_7$. Thus, each pattern Px denotes the specific pattern of features identified by defect training logic 304 and each edge $\delta i$ denotes the proximity measure in units of time between two neighboring patterns. The edge joining the two neighboring patterns shows the transition from one pattern (node) to its neighboring pattern (its neighboring node).

The proximity measure is the difference in the time of occurrences between two neighboring patterns, and it is represented by a numerical weight on the edge connecting the two patterns (nodes). During the Defect Learning Phase, defect training logic 304 populates the proximity parameters of the defect model with values computed from the set of training logs 308. Defect training logic 304 may store the set of previously identified defect models 314 in storage 310 using incidence matrices and example of which is illustrated in FIG. 6 in accordance with an illustrative embodiment (other forms of representation and storage may also be used). Defect training logic 304 then implements each defect model using weighted graphs, although and other forms of implementation may also possible. As is shown in exemplary incidence matrix 604, the sign in the entries of incidence matrix indicates the direction of flow. For example, with respect to Defect Y described previously, to correctly denote the transition (edge $\delta_4$) between pattern $P_E$ and $P_F$, defect training logic 304 assigns a numerical value of 1 in an entry of column $P_E$ associated with edge $\delta_4$ and a numerical value of −1 in the entry of column $P_F$ associated with edge $\delta_4$. Therefore, by reading the incidence matrix of, it is easily understood pattern $P_E$ comes before pattern $P_F$ and has a proximity parameters associated with edge $\delta_4$.

Therefore, each defect model in the set of previously identified defect models 314 represents a "DNA" of a defect and defect identification mechanism 302 relies on the DNA of the set of previously identified defect models 314 for matching defect(s) within incoming logs. Once defect training logic 304 has "trained" probabilistic defect identification mechanism 302 with the set of previously identified defect models 314, defect detection logic 306 may then match patterns and sequences in an incoming log with one or more defect models, i.e. Defect DNAs, in the set of previously identified defect models 314. In order to match patterns and sequences in an incoming log with one or more defect models in the set of previously identified defect models 314, defect detection logic 306 receives an incoming log 316 which is received to discover pattern sequences of interest and extract salient features pertaining to a defect or a group of defects present in the incoming log 316. Defect detection logic 306 extracts paired features, skipped features, and/or positional features from the incoming log 316 by implementing a process whereby a corpus/semantics, structural, and sequential features are uncovered in the incoming log 316. Utilizing the extracted features, defect detection logic 306 uncovers one or more patterns contained in the incoming log 316 as well as associated proximities between the patterns, which are a distance measure in units of time. With the patterns and proximities identified, defect detection logic 306 generates one or more defect models for the incoming log 316. If the defect models in the set of previously identified defect models 314 are stored as incidence matrices, defect detection logic 306 transforms each defect model in the one or more defect models for the incoming log 316 into an incidence matrix as a form of representation. The incidence matrix completely describes all information in the defect model where d in incidence matrix is the proximity (distance measure in units of time) between two neighboring patterns, which is the weight edge of the defect model, and P in incidence matrix denote the patterns. As stated previously, the sign of number in the matrix represents the sequence of patterns.

Defect detection logic 306 then compares each defect model in the one or more defect models generated for the incoming log 316 to each of the defect model in the set of previously identified defect models 314. Defect detection logic 306 is able to retrieve patterns and features of patterns associated with defect models in the set of previously identified defect models 314. When processing the incoming log 316, defect detection logic 306 checks the features of the incoming log 316. If the feature is the same as the features associated with a pattern in a defect model in the set of previously identified defect models 314, defect detection logic 306 retrieves detailed information of the feature from the pattern associated the defect model. Defect detection logic 306 stores the feature and the features information in hash table that maps the features to the specific pattern. Thus, defect detection logic 306 analyzes each feature of the incoming log 316 one-by-one to determine whether the feature matches with a feature that has already been stored in the hash table. If the feature exists in the hash table, defect detection logic 306 passes the detailed information of feature to all related patterns and a score of the feature is incremented. Defect detection logic 306 then proceeds to the next feature. If the feature does not exist in the hash table, defect detection logic 306 stops the current score, thereby ending the current pattern, and determines whether the score meets or exceeds a probability threshold. If the score meets or exceeds the probability threshold, defect detection logic 306 passes the defect as a defect in the incoming log 316. If the score fails to meet the probability threshold, defect detection logic 306 reinitialize the score and restarts the matching process. Therefore, when defect detection logic 306 identifies a match in features and thus patterns, defect detection logic 306 identifies that incoming log is found to contain a particular defect.

A pattern is said to be detected in the incoming logs when the probability threshold is met or exceeded, which is computed by the formula:

$$P(PatternP_k\ occurring) = \frac{\sum_{i=1}^{n} W_{f_i}}{n}$$

where $W_{f_i}$ denotes the weight assigned to a feature in the pattern exceeds a probability threshold configured for the pattern.

When a defect model is matched by defect detection logic 306, proximity parameters for pairs of neighboring patterns in the defect model from the incoming log 316 are sent to defect training logic 304 through a feedback loop. The updated proximity parameters of the incidence matrix are then updated into the set of previously identified defect models 314. The objective of having this feedback mechanism is to continually refine the proximity parameters in the incidence matrix of a defect to improve the detection accuracy. During defect detection, if the defect model of the incoming log 316 fails to match one or more defect models in the set of previously identified defect models 314, the incoming logs will be fed to defect training logic 304 as a training log and will be processed by defect training logic 304 as discussed previously.

Thus, each defect model includes the pattern sequence information of a defect. The probability of a pattern occurring (or the probabilistic score of a pattern) is computed for each pattern in the defect model. If the probabilistic score for a pattern meets a probability threshold for set for the pattern, it indicates that the pattern has been detected in the logs and the system will continue to detect the next pattern (the next node) in the defect model using the same mechanism, until all the patterns in the defect model are covered. When all the patterns in the defect model are detected, the system will output the defect information to the user along with any existing solution and/or workaround. The probability threshold measures the minimum number of features that need to be detected in a pattern for the pattern to be considered as being detected.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), in some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
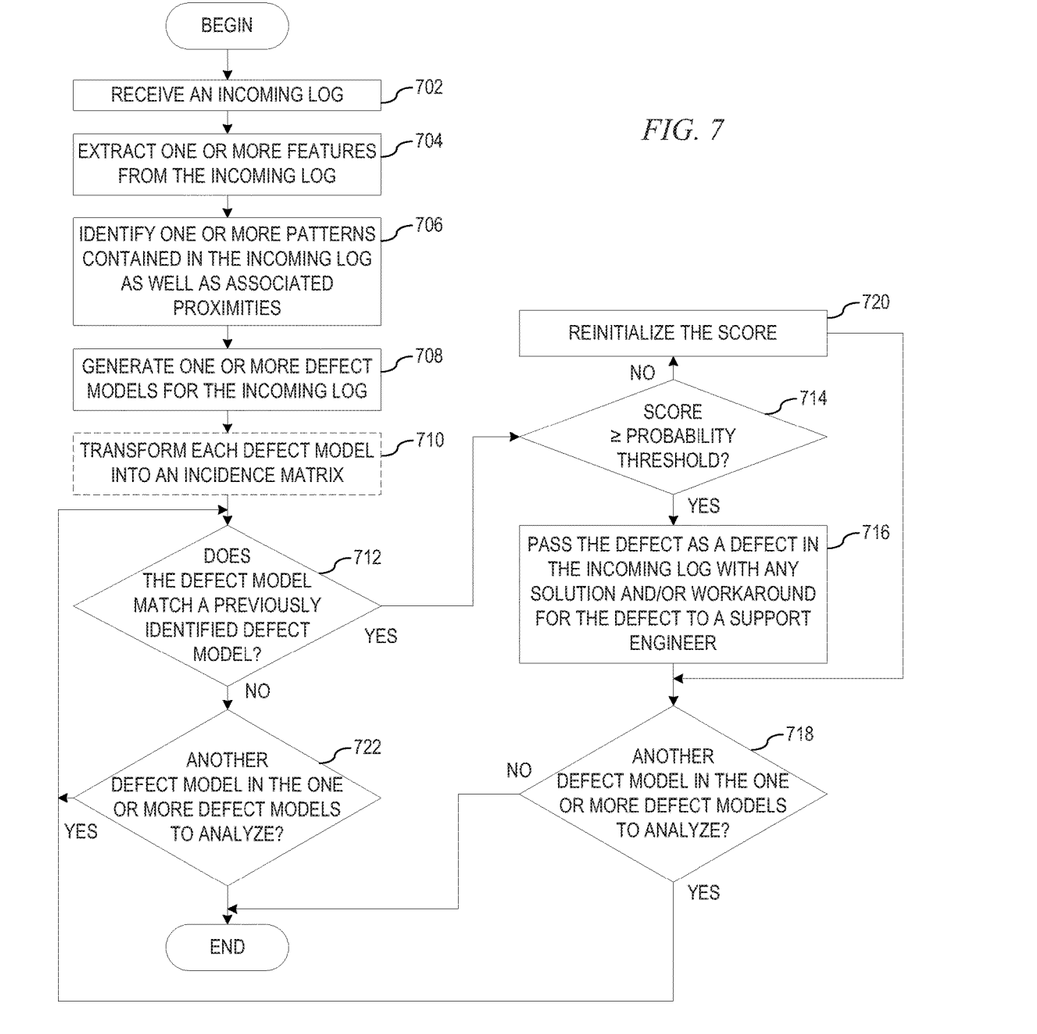
FIG. 7 depicts a flowchart of the operation performed by a probabilistic defect identification mechanism in detecting one or more defects in an incoming log in accordance with an illustrative embodiment.

FIG. 7 depicts a flowchart of the operation performed by a probabilistic defect identification mechanism in detecting one or more defects in an incoming log in accordance with an illustrative embodiment. As the operation begins, the probabilistic defect identification mechanism receives an incoming log to discover pattern sequences of interest and extract salient features pertaining to a defect or a group of defects present in the incoming log (step 702). The probabilistic defect identification mechanism extracts one or more features from the incoming log (step 704) by uncovering corpus/semantics, structural, and sequential features in the incoming log, the features being one of paired features, skipped features, and/or positional features. Utilizing the extracted features, the probabilistic defect identification mechanism identifies one or more patterns contained in the incoming log as well as associated proximities between the patterns, which are a distance measure in units of time (step 706). With the patterns and proximities identified, the probabilistic defect identification mechanism generates one or more defect models for the incoming log (step 708). As an optional step, if defect models in a set of previously identified defect models are stored as incidence matrices, the probabilistic defect identification mechanism may transform each defect model in the one or more defect models for the incoming log into an incidence matrix (step 710).

For each defect model in the one or more defect models generated for the incoming log, the probabilistic defect identification mechanism compares the defect to each of the defect model in the set of previously identified defect models to determine whether there is a match (step 712). If at step 712 the probabilistic defect identification mechanism determines there is a match, the probabilistic defect identification mechanism determines whether a score calculated for the match meets or exceeds a probability threshold (step 714). If at step 714 the score meets or exceeds the probability threshold, the probabilistic defect identification mechanism passes the defect as a defect in the incoming log also with any solution and/or workaround for the defect to a support engineer (step 716) and determines whether there is another defect module in the one or more defect models generated for the incoming log to analyze (step 718). If at step 714 the score fails to meet the probability threshold, the probabilistic defect identification mechanism reinitialize the score (step 720) and determines whether there is another defect module in the one or more defect models generated for the incoming log to analyze (step 718). If at step 718 there is another defect module in the one or more defect models generated for the incoming log to analyze, the operation returns to step 712. If at step 718 there is not another defect module in the one or more defect models generated for the incoming log to analyze, the operation ends.

If at step 712 the probabilistic defect identification mechanism determines there is no match to a defect model in the set of previously identified defect models, the probabilistic defect identification mechanism determines whether there is another defect model in the one or more defect models generated for the incoming log (step 722). If at step 722 there is another defect model in the one or more defect models generated for the incoming log, the operation return to step 712 for the next defect model in the one or more defect models generated for the incoming log. If at step 722 there is not another defect model in the one or more defect models generated for the incoming log, the operation ends.

Figure 8:
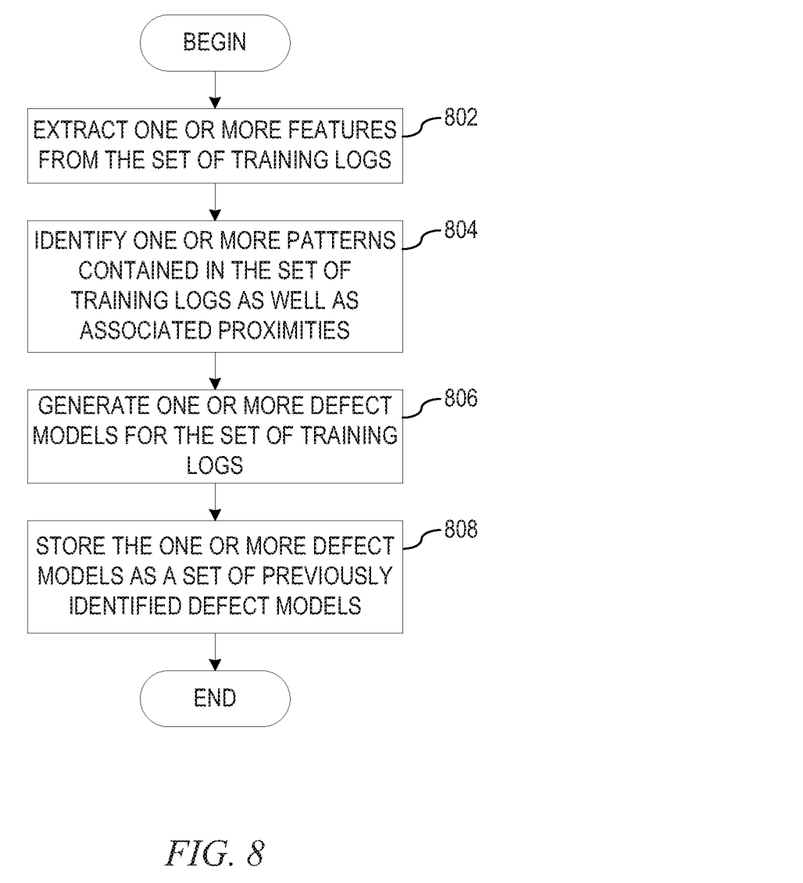
FIG. 8 depicts a flowchart of the operation performed by a probabilistic defect identification mechanism in training to identify defects in an incoming log in accordance with an illustrative embodiment.

FIG. 8 depicts a flowchart of the operation performed by a probabilistic defect identification mechanism in training to identify defects in an incoming log in accordance with an illustrative embodiment. As the operation begins, after normalization of a set of substrings in a set of training logs, the probabilistic defect identification mechanism extracts one or more features from the set of training logs (step 802) by uncovering corpus/semantics, structural, and sequential features in the set of training logs, the features being one of paired features, skipped features, and/or positional features. Utilizing the extracted features, the probabilistic defect identification mechanism identifies one or more patterns contained in the set of training logs as well as associated proximities between the patterns, which are a distance measure in units of time (step 804). With the patterns and proximities identified, the probabilistic defect identification mechanism generates one or more defect models for the set of training logs (step 806). The probabilistic defect identification mechanism then stores the one or more defect models as a set of previously identified defect models (step 808), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for identifying defects based on probabilistic techniques, factoring in proximity measure between patterns and pattern sequences in logs. By detecting known defects, existing solutions and/or workarounds are provided to the user to expedite solving the customer's issue. No time is lost exchanging additional information between customer and support engineers describing the symptoms of the issue. New defects are easily added to the known defects list just by analyzing the incoming logs, without any fancy log query syntax. Due to probabilistic nature of the proposed method, small variations of log format, such as different software versions or configurations, may be accepted and still lead to successful detection, improving coverage, precision, and reducing workload of the support engineers. The deterministic component of the illustrative embodiments ensures that the expected events really happened, and the description of the problem matches the observed log messages. The illustrative embodiments improve defect resolution for the customers and dramatically reduce the lead time to close customers' issues. As a result, an organization may achieve huge cost savings and deliver a consistent customer experience.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory coupled to the processor, for detecting one or more defects in an incoming log, the method comprising:
   responsive to receiving the incoming log, extracting, by the processor, one or more features from the incoming log by uncovering corpus/semantics, structural, and sequential features in the incoming log;
   utilizing the one or more features, identifying, by the processor, one or more patterns, one or more pattern sequences of the one or more patterns, and one or more proximities associated with the one or more patterns contained in the incoming log;
   generating, by the processor, one or more defect models for the incoming log using the identified one or more patterns, the one or more pattern sequences, and one or more proximities;
   for each defect model in the one or more defect models for the incoming log, comparing, by the processor, a set of patterns in the defect model to a set of patterns in each previously identified defect model in a set of previously identified defect models;
   responsive to matching the set of patterns in the defect model to the set of patterns in a previously identified defect model, determining, by the processor, whether a score associated with each pattern match meets or exceeds an associated probability threshold; and
   responsive to each score meeting or exceeding the associated probability threshold, passing, by the processor, a defect identification associated with the previously identified defect model along with any solution and/or workaround for the previously identified defect to a support engineer so that the defect in the incoming log is addressed.

2. The method of claim 1, further comprising:
   responsive to the score failing to meet or exceed the probability threshold, proceeding, by the processor, to analyze a next unanalyzed defect model in the one or more defect models for the incoming log.

3. The method of claim 1, further comprising:
   responsive to a failure to match the defect model to a previously identified defect model, generating, by the processor, a new defect model to be added as a previously identified defect model to the set of previously identified defect models.

4. The method of claim 1, wherein the previously the set of previously identified defect models is generated by the method comprising:
   after normalization of a set of substrings in a set of training logs, extracting, by the processor, one or more features from the set of training logs by uncovering corpus/semantics, structural, and sequential features in the set of training logs;
   utilizing the extracted features, identifying, by the processor, one or more patterns contained in the set of training logs, one or more pattern sequences of the one or more patterns contained in the set of training logs, and one or more proximities associated with the one or more patterns contained in the set of training logs;
   generating, by the processor, one or more defect models for the set of training logs, using the identified one or more patterns contained in the set of training logs, one or more pattern sequences of the one or more patterns contained in the set of training logs, and the one or more proximities associated with the one or more patterns contained in the set of training logs; and storing, by the processor, the one or more defect models as a set of previously identified defect models.

5. The method of claim 4, wherein normalizing the set of substrings in the set of training logs comprises:

substituting, by the processor, substrings in the set of substrings that include changing values with placeholder tokens.

6. The method of claim 1, wherein the features are at least one of a paired feature, a skipped feature, or a positional feature.

7. The method of claim 1, wherein each proximity in the one or more proximities is a distance measure in units of time.

8. The method of claim 1, further comprising:

transforming, by the processor, each defect model in the set of defect models for the incoming log to an incidence matrix.

9. A computer program product comprising a computer readable storage medium having a computer readable program stored therein, wherein the computer readable program, when executed on a computing device, causes the computing device to:

responsive to receiving the incoming log, extract one or more features from the incoming log by uncovering corpus/semantics, structural, and sequential features in the incoming log;

utilizing the one or more features, identify one or more patterns, one or more pattern sequences of the one or more patterns, and one or more proximities associated with the one or more patterns contained in the incoming log;

generate one or more defect models for the incoming log using the identified one or more patterns, the one or more pattern sequences, and one or more proximities;

for each defect model in the one or more defect models for the incoming log, compare a set of patterns in the defect model to a set of patterns in each previously identified defect model in a set of previously identified defect models;

responsive to matching the set of patterns in the defect model to the set of patterns in a previously identified defect model, determine whether a score associated with each pattern match meets or exceeds an associated probability threshold; and responsive to each score meeting or exceeding the associated probability threshold, pass a defect identification associated with the previously identified defect model along with any solution and/or workaround for the previously identified defect to a support engineer so that the defect in the incoming log is addressed.

10. The computer program product of claim 9, wherein the computer readable program further causes the computing device to:

responsive to the score failing to meet or exceed the probability threshold, proceed to analyze a next unanalyzed defect model in the one or more detect models for the incoming log.

11. The computer program product of claim 9, wherein the computer readable program further causes the computing device to:

responsive to a failure to match the detect model to a previously identified defect model, generate a new defect model to be added as a previously identified defect model to the set of previously identified defect models.

12. The computer program product of claim 9, wherein the previously the set of previously identified defect models is generated by the computer readable program further causes the computing device to:

after normalization of a set of substrings in a set of training logs, extract one or more features from the set of training logs by uncovering corpus/semantics, structural, and sequential features in the set of training logs;

utilizing the extracted features, identify one or more patterns contained in the set of training logs, one or more pattern sequences of the one or more patterns contained in the set of training logs, and one or more proximities associated with the one or more patterns contained in the set of training logs;

generate one or more defect models for the set of training logs, using the identified one or more patterns contained in the set of training logs, one or more pattern sequences of the one or more patterns contained in the set of training logs, and the one or more proximities associated with the one or more patterns contained in the set of training logs; and store the one or more defect models as a set of previously identified defect models.

13. The computer program product of claim 12, wherein the computer readable program to normalize the set of substrings in the set of training logs further causes the computing device to:

substitute substrings in the set of substrings that include changing values with placeholder tokens.

14. The computer program product of claim 9, wherein the computer readable program further causes the computing device to:

transform each defect model in the set of defect models for the incoming log to an incidence matrix.

15. An apparatus comprising:

a processor; and a memory coupled to the processor, wherein the memory comprises instructions which, when executed by the processor, cause the processor to:

responsive to receiving the incoming log, extract one or more features from the incoming log by uncovering corpus/semantics, structural, and sequential features in the incoming log;

utilizing the one or more features, identify one or more patterns, one or more pattern sequences of the one or more patterns, and one or more proximities associated with the one or more patterns contained in the incoming log;

generate one or more defect models for the incoming log using the identified one or more patterns, the one or more pattern sequences, and one or more proximities;

for each defect model in the one or more defect models for the incoming log, compare a set of patterns in the defect model to a set of patterns in each previously identified defect model in a set of previously identified defect models;

responsive to matching the set of patterns in the defect model to the set of patterns in a previously identified defect model, determine whether a score associated with each pattern match meets or exceeds an associated probability threshold; and responsive to each score meeting or exceeding the associated probability threshold, pass a defect identification associated with the previously identified defect model along with any solution and/or workaround for the previously identified defect to a support engineer so that the defect in the incoming log is addressed.

16. The apparatus of claim 15, wherein the instructions further cause the processor to:

responsive to the score failing to meet or exceed the probability threshold, proceed to analyze a next unanalyzed defect model in the one or more defect models for the incoming log.

17. The apparatus of claim 15, wherein the instructions further cause the processor to:

responsive to a failure to match the defect model to a previously identified defect model, generate a new defect model to be added as a previously identified defect model to the set of previously identified defect models.

18. The apparatus of claim 15, wherein the previously the set of previously identified defect models is generated by the instructions further causing the processor to:

after normalization of a set of substrings in a set of training logs, extract one or more features from the set of training logs by uncovering corpus/semantics, structural, and sequential features in the set of training logs;

utilizing the extracted features, identify one or more patterns contained in the set of training logs, one or more pattern sequences of the one or more patterns contained in the set of training logs, and one or more proximities associated with the one or more patterns contained in the set of training logs;

generate one or more defect models for the set of training logs, using the identified one or more patterns contained in the set of training logs, one or more pattern sequences of the one or more patterns contained in the set of training logs, and proximities associated with the one or more patterns contained in the set of training logs; and store the one or more defect models as a set of previously identified defect models.

19. The apparatus of claim 18, wherein the instructions to normalize the set of substrings in the set of training logs further cause the processor to:

substitute substrings in the set of substrings that include changing values with place holder tokens.

20. The apparatus of claim 15, wherein the instructions further cause the processor to:

transform each defect model in the set of defect models for the incoming log to an incidence matrix.

\* \* \* \* \*